US012640813B2

(12) United States Patent
Struck et al.

(10) Patent No.: US 12,640,813 B2
(45) Date of Patent: May 26, 2026

(54) SELF-COMPENSATING POLARIZATION MODULATOR

(71) Applicant: Tesat-Spacecom GmbH & Co. KG, Backnang (DE)

(72) Inventors: Julian Struck, Backnang (DE); Thomas Hiemstra, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 211 days.

(21) Appl. No.: 18/227,509

(22) Filed: Jul. 28, 2023

(65) Prior Publication Data

US 2024/0039633 A1 Feb. 1, 2024

(30) Foreign Application Priority Data

Jul. 29, 2022 (DE) .......................... 102022119077.3

(51) Int. Cl.
*H04B 10/2587* (2013.01)
*G02B 27/28* (2006.01)
*H04B 10/516* (2013.01)

(52) U.S. Cl.
CPC ....... *H04B 10/2587* (2013.01); *G02B 27/283* (2013.01); *H04B 10/516* (2013.01)

(58) Field of Classification Search
CPC . H04B 10/2587; H04B 10/516; G02B 27/283
(Continued)

(56) References Cited

U.S. PATENT DOCUMENTS 6,333,808 B1 12/2001 Webb et al.
6,459,518 B1 10/2002 Suzuki et al.
(Continued)

FOREIGN PATENT DOCUMENTS

| CN | 118300695 A | * | 7/2024 | .......... H04L 9/0858 |
| EP | 1708389 A1 | * | 10/2006 | ....... H04B 10/50597 |
| WO | WO-2009121003 A1 | * | 10/2009 | .......... H04B 10/532 |

OTHER PUBLICATIONS

Grande et al; Implementation of a hybrid scheme for coherent plug-and-play quantum key distribution, Jun. 2018, Springer Nature 2018; pp. 1-12. (Year: 2022).*

(Continued)

*Primary Examiner* — Amritbir K Sandhu
(74) *Attorney, Agent, or Firm* — Lerner David LLP

(57) ABSTRACT

A modulator unit for modulating the polarization of an optical signal includes a light source, a polarization-dependent phase modulator, and a reflector. The light source outputs an optical signal and emits it as the input signal directed at the phase modulator. The optical signal contains a first and a second polarization components having a first and a second polarization directions, respectively. The phase modulator modulates a first phase of the first polarization component in the first polarization direction and passes on the modulated input signal to the reflector. The reflector retroreflects the received optical signal towards the phase modulator and changes its polarization by 90°. The phase modulator modulates a second phase of the second polarization component of the retroreflected optical signal in the first polarization direction. The modulator unit outputs the modulated optical signal as the polarization-modulated output signal.

9 Claims, 2 Drawing Sheets

(58) Field of Classification Search
USPC ......................................................... 398/170
See application file for complete search history.

(56) References Cited

U.S. PATENT DOCUMENTS

| | | | | |
|---|---|---|---|---|
| 8,396,373 | B2 * | 3/2013 | Roes .................... | H04B 10/532 |
| | | | | 359/237 |
| 9,647,426 | B1 * | 5/2017 | Fish ..................... | G02B 27/283 |
| 10,330,959 | B2 * | 6/2019 | Wen ................... | G02B 6/29335 |
| 10,608,402 | B2 * | 3/2020 | Koch .................. | H01S 3/10061 |
| 11,770,190 | B1 * | 9/2023 | Esman ............. | H04B 10/25759 |
| | | | | 398/115 |
| 2013/0156361 | A1 * | 6/2013 | Kojima ................... | G02B 6/14 |
| | | | | 385/11 |

OTHER PUBLICATIONS

Agnesi et al; All-fiber self-compensating polarization encoder for quantum key distribution ;2019, Optics letters vol. 44 No. 10, pp. 1-4. (Year: 2019).*

Martinez et al; Proof-of-concept of real-world quantum key distribution with quantum frames ; 2009, New Journal of Physics; pp. 1-27. (Year: 2009).*

Grande et al; Implementation of a hybrid scheme for coherent plug-and-play quantum key distribution; Jun. 2018, Springer Nature; pp. 1-12. (Year: 2018).*

Extended European Search Report for Application No. 23186293.9 dated Jan. 15, 2024, pp. 1-5.

\* cited by examiner

SELF-COMPENSATING POLARIZATION MODULATOR

FIELD OF THE INVENTION

The present description relates to optical signal generation and signal transmission, in particular the transmission of information by means of polarization modulation. The description especially relates to a modulator unit for modulating the polarization of an optical signal, an optical signal transmission link comprising such a modulator unit, and a system having such a modulator unit, for example, in the form of a satellite.

BACKGROUND OF THE INVENTION

Information can be transmitted using technical means in that an information unit is assigned to a specific state of a carrier signal. The carrier signal is typically an electromagnetic wave from a specific spectral range. To now apply information to the carrier signal, a property of the carrier signal is changed. The change as such or the state of the carrier signal after the change correspond here to the information to be transmitted. The carrier signal is typically changed in time intervals in order to transmit multiple information units in this way.

Depending on the carrier signal, various physical features of the carrier signal come into consideration as information carriers, for example: the amplitude, the frequency, the phase, and/or the polarization. If one of these features is changed over time, this procedure is referred to as modulation.

Various technical components are used on the signal processing path in order to process the carrier signal and introduce the desired information into the carrier signal before the carrier signal is transmitted via the transmission link (in a wired or wireless manner).

The components used in the preparation and processing of the carrier signal serve to modulate the carrier signal accordingly, so that the information to be transmitted is applied correctly to the carrier signal and is transmitted with as little interferences and losses as possible via the transmission link.

However, it can happen that in addition to the desired modulation (change of the carrier signal), undesired changes of the carrier signal also take place, for example, due to parasitic effects or other undesired properties of the components involved in the preparation of the carrier signal. In this case, it is not always recognizable at a receiver of the carrier signal which change of the carrier signal is based on the desired modulation and which change was induced by undesired effects. The quality of the signal can thus be negatively influenced.

BRIEF DESCRIPTION OF THE INVENTION

Proceeding therefrom, an object can be considered that of reducing or eliminating the influence of undesired effects of a modulator unit on a carrier signal modulated for transmission. In particular, an object can be considered that of avoiding polarization errors in a polarization-modulated optical signal.

According to one aspect, a modulator unit for modulating the polarization of an optical signal is specified. The modulator unit includes a light source, a polarization-dependent phase modulator, and a reflector. The light source is designed to output an optical signal and to emit it as the input signal in the direction of the polarization-dependent phase modulator, wherein the optical signal contains a first polarization component having a first polarization direction and a second polarization component having a second polarization direction. The polarization-dependent phase modulator is designed to modulate a first phase of the first polarization component of the input signal in the first polarization direction and to pass on the input signal thus modulated to the reflector. The reflector is designed to retroreflect the received optical signal in the direction of the polarization-dependent phase modulator and at the same time to change the polarization of the optical signal (for example by 90°), so that the first polarization component having the first polarization direction receives the second polarization direction and the second polarization component having the second polarization direction receives the first polarization direction. The polarization-dependent phase modulator is designed to modulate a second phase of the second polarization component of the retroreflected optical signal in the first polarization direction. The modulator unit is designed to output the optical signal thus modulated as a polarization-modulated output signal.

The optical signal represents a superposition of two orthogonal polarization components. The polarization-dependent phase modulator is designed to apply different phases to both polarization components.

In principle, the light source can be a light emitter (for example a laser) or the output of a light-guiding element. In one exemplary embodiment, the optical signal passes through the same optical path of the modulator unit twice in opposite directions. On the outgoing journey, the optical signal runs from the light source through the polarization-dependent phase modulator to the reflector. The reflector retroreflects the optical signal and at the same time rotates the phase of the optical signal by 90° (either +90° or −90°). For example, the reflector is implemented as a Faraday mirror, which is a retroreflector based on the Faraday effect that contains a crystal to which a magnetic field is applied and which rotates the polarization depending on the propagation direction of the magnetic field. For example, if horizontally polarized light is incident on the reflector, it is retroreflected as vertically polarized light. The reflector is thus the combination of a Faraday rotator and a mirror. The Faraday rotator is initially passed by the optical signal and the polarization of the light is rotated here by 45° (+45° or −45°). The optical signal is then reflected and passes the Faraday rotator again, wherein its polarization is rotated by a further 45° (in the same direction as in the first step). In total, the polarization of the retroreflected light then differs from the polarization of the incident light by 90°.

In particular because the optical signal passes through the same optical path twice with exchanged polarization directions, parasitic influences of the modulator unit on the phase of the optical signal and error phases are eliminated, in particular phase errors which occur due to slow thermal and mechanical fluctuations of the modulator unit, in particular on the link from the polarization-dependent phase modulator inclusive up to the reflector inclusive, but also before the polarization-dependent phase modulator.

On the outgoing journey, for example, the component of the optical signal having horizontal polarization (assumed as the first polarization direction for the example) is modulated (a first phase is modulated on this component) and the component having vertical polarization (assumed as the second polarization direction for the example) passes the polarization-dependent phase modulator without changes being performed on the phase of this component. The optical signal is now retroreflected by the reflector and the polarization is rotated by 90°, the component having horizontal polarization is now vertically polarized, the component having vertical polarization is now horizontally polarized. On the return journey, the optical signal passes through the polarization-dependent phase modulator again, and now the (now) horizontally polarized component (which corresponds to the vertically polarized component of the outgoing journey) is modulated in its phase and the (now) vertically polarized component passes the polarization-dependent phase modulator without further change of its phase. This means that the polarization-dependent phase modulator only has a single modulation axis, which remains the same on the outgoing and return journey, thus acts on the same polarization direction.

If an error phase (or error phase shift) is introduced into the optical signal on the outgoing journey in that, for example, the phase of the horizontally polarized component is parasitically influenced in a different way than the phase of the vertically polarized component, this error phase cancels itself out on the return journey, because the optical signal passes through the same optical path with a polarization rotated by 90° and the same error phase is now applied on the respectively other polarization axis. In this way, all relative phase errors are introduced in the same manner in both polarization axes.

The phase which is applied to the horizontally polarized component of the return journey is designated as the second phase, because the first phase is contained in the vertically polarized component of the optical signal on the return journey and the first phase can be different from the second phase.

In the example illustrated here, reference is made in a specific manner to horizontally and vertically polarized components of the optical signal, namely that on the outgoing and return journey through the polarization-dependent phase modulator, in each case the horizontally polarized component is phase-modulated. However, it is apparent that this example is not restrictive and the polarization-dependent phase modulator can phase-modulate the vertically polarized component or any other component of the optical signal instead of the horizontally polarized component. It is decisive that the polarization of the optical signal is rotated by 90° between the two processes, in which the phase of a polarization component of the optical signal is modulated.

As a result, in this structure both the vertically polarized component and the horizontally polarized component of the optical signal are modulated in a modulator unit having a single optical path. The resulting optical signal has in total received a desired polarization modulation in that the first polarization component having a first polarization direction is modulated in its phase on the outgoing journey and the second polarization component, which has the first polarization direction on the return journey, is modulated in its phase on the return journey, wherein the polarization of the optical signal is changed on the return journey by 90° in comparison to the outgoing journey, however.

The polarization-dependent phase modulator used here is a phase-changing modulator, which acts on a polarization component of an optical signal, i.e., the polarization-dependent phase modulator changes the phase of two polarization components of the optical light orthogonal to one another. For example, the polarization-dependent phase modulator is an electro-optical modulator, EOM. It is to be understood that any reference to an EOM in this description is only by way of example and applies in principle to a polarization-dependent phase modulator.

For example, the polarization-dependent phase modulator has two optical axes aligned orthogonally to one another. By means of electrical energy, for example, an applied voltage along one of these optical axes, its index of refraction is modified and a phase change of the polarization component of the optical signal in relation to the other or orthogonal optical axis results.

The structure of the modulator unit is very space-saving and compact due to the use of a Faraday mirror. A polarization-dependent phase modulator can be switched very rapidly, so that the modulator unit described here can be used up into high frequency ranges, for example, several 10 GHz, for example up to 30 to 40 GHz or also higher frequency ranges.

Various polarization states of an optical signal may be set using the modulator unit described here. Various discrete states of the polarization can be set in this case, for example, in that the phase of the horizontally polarized component of the optical signal is changed with respect to the phase of the vertically polarized component of the optical signal. The polarization of the optical signal can be continuously changed arbitrarily in principle, however, without being limited to a restricted number of polarization states.

According to one embodiment, the polarization-dependent phase modulator includes a crystal, which is designed to be subjected to an electrical voltage and to change its index of refraction in this case, by which the phase of the first polarization component of the optical signal is changed. However, the index of refraction can also be changed in that a mechanical stress is applied.

The polarization-dependent phase modulator can contain, for example, a birefringent medium, which changes the phase of an optical signal passing through the optical medium upon application of a voltage.

According to a further embodiment, the modulator unit is designed to vary the electrical voltage applied to the crystal over time.

For example, the modulator unit contains an energy supply which provides a specifiable electrical voltage. A control unit activates the energy supply so that the latter provides a desired electrical voltage at the polarization-dependent phase modulator. The phase between differently polarized components of the optical signal is changed by the electrical voltage varying over time at the polarization-dependent phase modulator.

According to a further embodiment, an absolute value of the first phase of the first polarization component of the input signal in the first polarization direction differs from an absolute value of the second phase of the second polarization component of the retroreflected optical signal in the first polarization direction.

In other words, this means that the polarization-dependent phase modulator modulates a different phase on the horizontally polarized component of the optical signal on the outgoing journey than on the then horizontally polarized component of the retroreflected signal on the return journey. The polarization of the output signal of the modulator unit thus changes.

According to a further embodiment, the polarization-dependent phase modulator is designed to change a difference between the first phase and the second phase over time.

In that the polarization-dependent phase modulator changes the difference of the phases on the outgoing journey and the return journey over time, the polarization of the output signal is also changed over time.

Overall, the polarization of the output signal of the modulator unit is freely settable between two linear polarizations (horizontal, vertical) and two circular polarizations (Z+ and Z−). However, the polarization can also be set continuously to all elliptical states lying between the discrete states.

According to a further embodiment, the light source is designed to emit or output light having a well-defined optical mode. In the present context, the polarization and coherence properties of the optical signal are important. For example, the light source is a laser.

ers are distinguished in that they can emit optical signals having a well-defined polarization. They are therefore suitable in particular for applications as described here.

According to a further embodiment, the modulator unit is designed to activate the light source so that the light source emits pulsed optical signals.

A light pulse passes the polarization-dependent phase modulator and a first polarization component is modulated in its phase. The light pulse is then conducted further to the reflector, the polarization of the light pulse is changed there and the light pulse is reflected back to the polarization-dependent phase modulator. On the return journey, the polarization-dependent phase modulator again modulates a phase of a polarization component of the light pulse.

The light pulse is, for example, designed so that, in the polarization-dependent phase modulator, the light on the outgoing journey to the reflector and the light on the return journey from the reflector are not superimposed.

Except for the use of pulsed light signals, the light source can also emit a continuous light signal, the polarization of which is changed as described.

In another embodiment, the modulator unit can be designed so that it modulates and emits pulsed optical signals. In this example, the modulator unit can receive the pulsed optical signals from another source.

According to a further embodiment, the modulator unit furthermore includes a beam splitter, which is arranged between the light source and the polarization-dependent phase modulator and is designed to guide at least a part of the retroreflected optical signal phase-modulated by the polarization-dependent phase modulator in a specified direction.

The beam splitter is arranged to guide the optical signal output by the polarization-dependent phase modulator at least partially structurally in a desired direction so that the optical signal output by the polarization-dependent phase modulator does not output exclusively in the direction of the light source which emits the input signal to the polarization-dependent phase modulator. The output signal thus generated carries information in its polarization, which can be read and processed on the part of a receiver.

In one variant, a circulator can also be used in place of the beam splitter.

According to a further aspect, an optical signal transmission link is specified. The optical signal transmission link includes a modulator unit as described herein and a receiver. The modulator unit functions as a signal source or part of a transmitting unit, which outputs an optical signal to which information is applied. The signal source transmits the modulated optical signal in the direction of the receiver. The receiver is designed to receive optical signals. The modulator unit is arranged to emit the output signal in the direction of the receiver.

The signal transmission link can be designed for unidirectional or bidirectional signal transmission. In the case of bidirectional signal transmission, there are at least two communication units which both include a modulator unit and also a receiving unit.

The modulator unit described herein is implemented as part of an optical signal transmission link. The optical signal transmission link is therefore configured to transmit information by means of polarization modulation of an optical carrier signal. The polarization modulation is introduced by means of the modulator unit into the optical carrier signal. The modulator unit compensates for phase errors due to the components participating in the modulation intrinsically, because the optical signal passes through the same optical path twice and in this case the polarization components of the optical signal orthogonal to one another are modulated in succession.

According to one embodiment, the modulator unit is arranged in a satellite. However, the modulator unit can be arranged in any other communication system.

According to a further aspect, a satellite having a modulator unit as described herein is specified.

A modulator unit as described herein can be used, for example, on optical signal transmission links which are used between two mobile units (air, water, or land vehicles or satellites), between a mobile unit and a remote station on the Earth's surface, or between two stationary units.

BRIEF DESCRIPTION OF THE DRAWINGS

Exemplary embodiments are described in more detail hereinafter on the basis of the appended drawings. The illustrations are schematic and are not to scale. Identical reference signs relate to identical or similar elements. In the figures.

DETAILED DESCRIPTION

Figure 1:
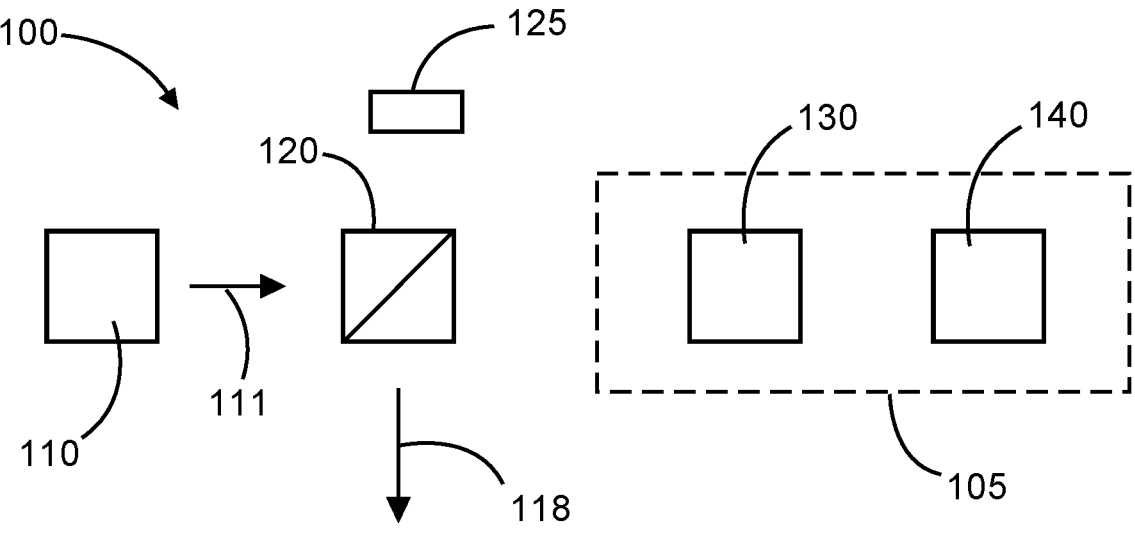
FIG. 1 shows a schematic illustration of a modulator unit.

FIG. 1 shows the structural design of a modulator unit 100. The modulator unit 100 contains a light source 110, a beam splitter 120, a beam absorber 125, a polarization-dependent phase modulator in the form of an electro-optical modulator, EOM, 130, and a reflector in the form of a Faraday mirror 140. The EOM 130 and the Faraday mirror 140 can be designated jointly as a polarization modulator 105. Although reference is made here, for example, to a Faraday mirror 140, the corresponding explanations thus apply generally for a reflector mentioned herein.

The light source 110, which is a laser, for example, emits an optical signal in the form of the input signal 111. This input signal is supplied to the remaining components and its polarization is modulated to transmit information via the optical signal.

The information to be transmitted is modulated onto the output signal 118 in the polarization of the optical signal.

The way in which the polarization of the optical signal is modulated will now be described with reference to FIG. 2, which is to be considered in addition to FIG. 1.

Figure 2:
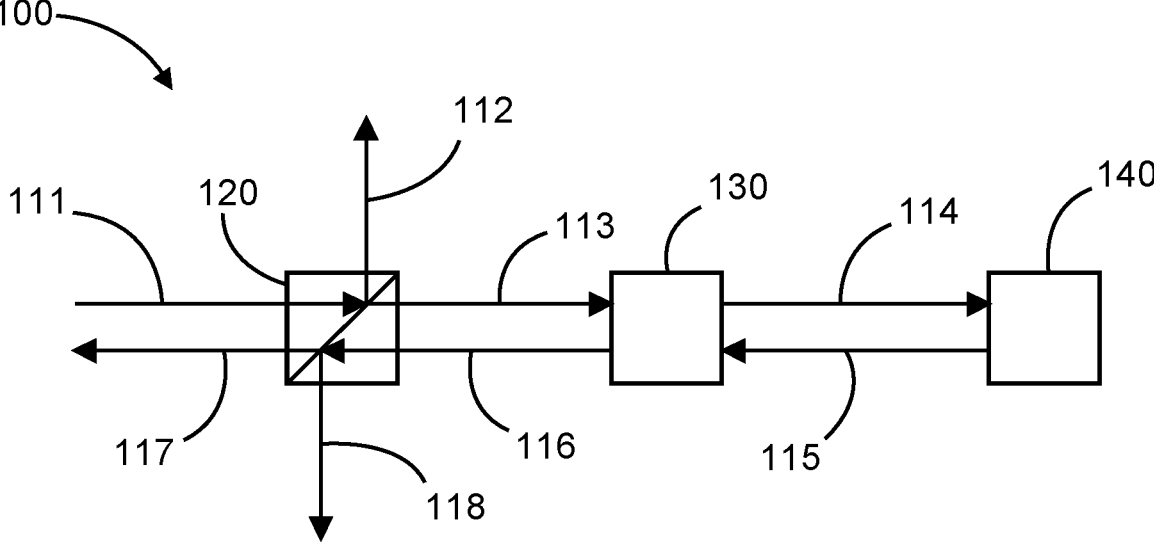
FIG. 2 shows a schematic illustration of the optical path through a modulator unit.

The path of the optical signal through the modulator unit 100 is described in FIG. 2. The state of the optical signal at various points in time or at various points in the modulator unit 100 is referred to here.

The input signal 111 is initially incident on the beam splitter 120. The beam splitter 120 is designed in this example as a non-polarizing beam splitter. A part of the input signal 111 is guided as the first part 112 of the split input signal in the direction of the beam absorber 125 and another part of the input signal 111 passes the beam splitter 120 as the second part 113 of the split input signal in the direction of the EOM 130.

The EOM 130 now modulates a polarization component of the second part 113 of the optical signal in that the component of the signal 113 having a polarization is changed in its phase. At the output of the EOM, the optical signal is now present as a once-modulated signal 114, thus as an optical signal in which one polarization component is modulated in the phase.

The Faraday mirror 140 retroreflects the once-modulated signal 114 and at the same time changes its polarization by 90°, so that the optical signal is reflected again to the EOM 130 as a mirrored signal 115.

If, for example, the horizontally polarized component of the optical signal was modulated on the outgoing journey between the signals 113 and 114 by the EOM, on the return journey, this modulation is now in the vertically polarized component of the optical signal 115, because the Faraday mirror 140 has changed the polarization by 90°. If the optical signal 115 now passes through the EOM 130 again on the return journey, the now horizontally polarized component (corresponding to the vertically polarized component on the outgoing journey which has not experienced a change of its phase on the outgoing journey) is thus changed in its phase.

The optical length between the EOM 130 and the Faraday mirror 140 is dimensioned so that an optical signal on the return journey is not superimposed on an optical signal on the outgoing journey within the EOM. Expressed in general, the length of the optical path between EOM and Faraday mirror is dimensioned so that a light pulse on the return journey is not superimposed on a light pulse on the outgoing journey. In particular, the length of the optical path is matched to the duration of a light pulse and the transmission rate.

Therefore, a phase is applied to both polarization components of the optical signal by the EOM on the same optical path. In that the corresponding phase is specified on the outgoing journey and return journey, the polarization of the optical signal can be varied.

The optical signal 116 is now phase-modulated in both polarization components. The polarization of the optical signal 116, in which the information to be transmitted is contained, results from the superposition of these two modulations.

The optical signal 116 is now again incident on the beam splitter 120, a part 117 of the optical signal passes the beam splitter and a further part 118 is deflected in another direction and corresponds to the output signal to be transmitted, in the polarization of which the information to be transmitted is contained. Alternatively, it is conceivable that the output signal passes the beam splitter and the deflected signal is discarded.

Figure 3:
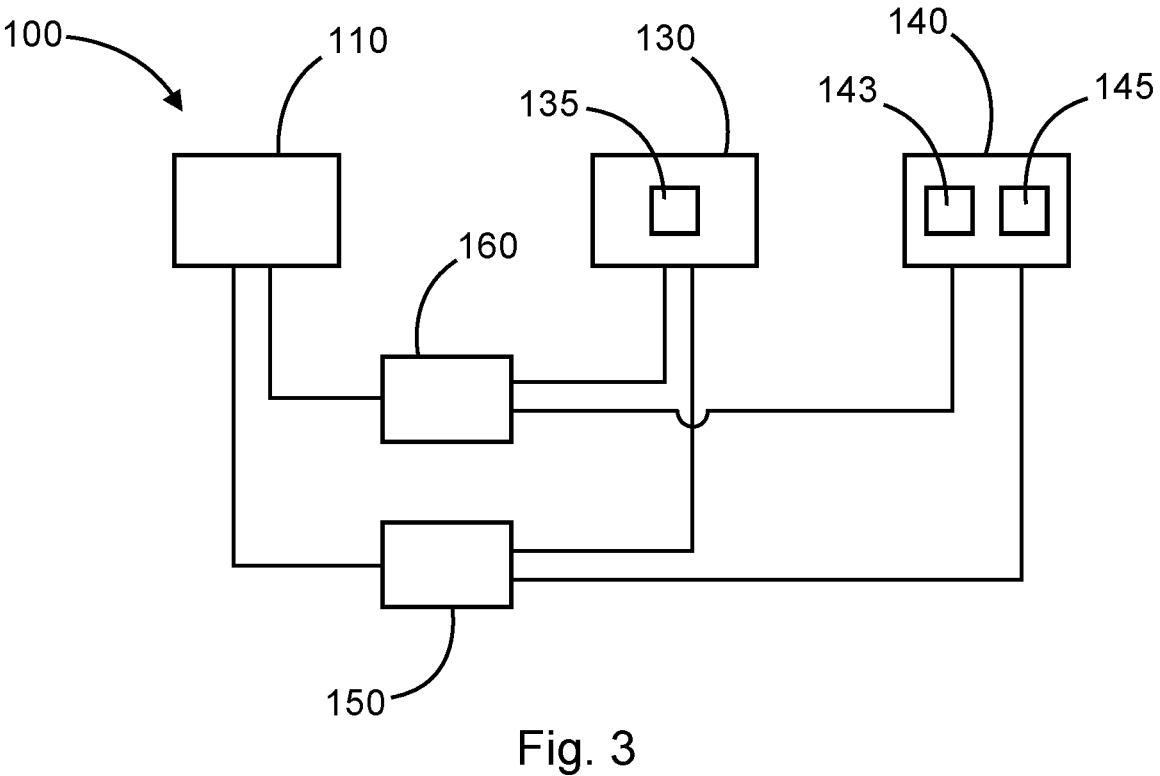
FIG. 3 shows a schematic illustration of a modulator unit.

FIG. 3 shows how the components of the modulator unit 100 are activated to introduce the information to be transmitted into the polarization of the optical signal.

The modulator unit 100 contains an energy supply 160 and a control unit 150. Both the energy supply 160 and the control unit 150 are connected to the light source 110, the EOM 130, and the Faraday mirror 140. The control unit 150 can also be connected directly to the energy supply 160, however, in order to specify an electrical voltage output by the energy supply 160 at the respective terminal.

The energy supply 160 supplies the light source 110 with electrical energy, so that the light source generates the optical signal, which functions as the input signal. Furthermore, the energy supply 160 supplies the EOM 130 with electrical energy, for example, an electrical voltage which is applied at a crystal 135. This electrical voltage influences the crystal 135 such that the phase of a component of a passing optical signal polarized in a specific manner is changed. For example, variations of the electrical voltage can change the phase by different strengths. The control unit 150 and the energy supply 160 activate the EOM so that it acts on the optical signal passing the EOM in the desired manner on the outgoing journey and the return journey of the optical signal and changes the phase of the influenced polarization component accordingly and as desired. For this purpose, the control unit and the energy supply have to switch correspondingly rapidly and activate the EOM.

The polarization of a passing optical signal is changed in the Faraday rotator 143, in the present example by 45°. The optical signal is then incident on the mirror 145, is reflected therefrom, and passes the Faraday rotator 143 again. The polarization of the optical signal is now again changed by 45° in the same direction, so that the polarization of the optical signal incident in the Faraday mirror and the polarization of the optical signal output by the Faraday mirror differ by 90°.

The control unit 150 is designed to activate the energy supply 160 and/or each individual one of the components 110, 130, 140 so that these components are supplied with the energy required for the function thereof. For this purpose, the control unit 150 can send control commands to the components 110, 130, 140 and/or control commands to the energy supply 160.

Figure 4:
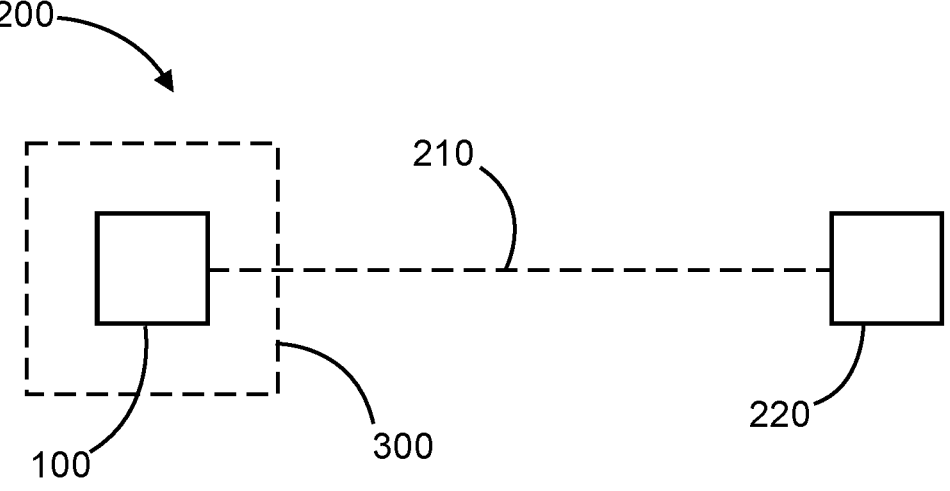
FIG. 4 shows a schematic illustration of an optical signal transmission link.

FIG. 4 shows an optical signal transmission link 200. A modulator unit 100 functions as a signal source or transmitter. The modulator unit 100 modulates the polarization of an optical signal as described above and transmits the modulated optical signal via a transmission path 210. The transmission path 210 is, for example, a wireless optical path.

The modulated optical signal is received by a remote station and processed. The remote station is the receiver 220. The modulator unit 100 can be arranged on board a satellite. The receiver 220 can be arranged on the Earth's surface or on board another satellite.

In addition, it is to be noted that "comprising" or "including" does not exclude other elements or steps and "a" or "one" does not exclude a plurality. Furthermore, it is to be noted that features or steps which have been described with reference to one of the above exemplary embodiments can also be used in combination with other features or steps of other exemplary embodiments described above. Reference signs in the claims are not to be viewed as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 modulator unit
105 polarization modulator

110 light source
111 input signal
112 first part of the split input signal
113 second part of the split input signal
114 once-modulated signal
115 mirrored signal
116 twice-modulated signal
117 branched signal
118 output signal
120 beam splitter
125 beam absorber
130 polarization-dependent phase modulator, electro-optical modulator
135 crystal
140 reflector, Faraday mirror
143 Faraday rotator
145 mirror
150 control unit
160 energy supply
200 optical signal transmission link
210 transmission path, optical signal
220 receiver
300 satellite

The invention claimed is:

1. A modulator unit for modulating the polarization of an optical signal, comprising:
a light source;
a polarization-dependent phase modulator;
a non-polarizing beam splitter arranged between the light source and the polarization-dependent phase modulator; and
a reflector;
wherein the light source is configured to output an optical signal and emit the output signal as an input signal to the non-polarizing beam splitter and in a direction of the polarization-dependent phase modulator, wherein the optical signal contains a first polarization component having a first polarization direction and a second polarization component having a second polarization direction before entering the non-polarizing beam splitter;
wherein the first polarization direction differs from the second polarization direction;
wherein the input signal to the non-polarizing beam splitter includes the first polarization component and the second polarization component, and the non-polarizing beam splitter is configured to pass on the input signal to the polarization-dependent phase modulator such that both the first polarization component and the second polarization component of the input signal pass though the polarization-dependent phase modulator in the same first direction towards the reflector,
wherein the polarization-dependent phase modulator is configured to modulate a first phase of the first polarization component of the input signal in the first polarization direction and to pass on the input modulated signal to the reflector;
wherein the reflector is configured to retroreflect the received optical signal in the direction of the polarization-dependent phase modulator as a retroreflected optical signal and at the same time to change polarization of the received optical signal, so that the first polarization component having the first polarization direction receives the second polarization direction and the second polarization component having the second polarization direction receives the first polarization direction, such that both the first polarization component and the second polarization component of the retroreflected signal pass though the polarization-dependent phase modulator in the same second direction away from the reflector, wherein the first direction towards the reflector is opposite the second direction away from the reflector;
wherein the polarization-dependent phase modulator is configured to modulate a second phase of the second polarization component of the retroreflected optical signal in the first polarization direction;
wherein the non-polarizing beam splitter is configured to guide at least a part of the retroreflected optical signal phase-modulated by the polarization-dependent phase modulator in a specified direction; and
wherein the modulator unit is configured to output the optical signal thus modulated as a polarization-modulated output signal.

2. The modulator unit as claimed in claim 1,
wherein the polarization-dependent phase modulator includes a crystal, configured to be subjected to an electrical voltage and to change its index of refraction, by which the phase of the first polarization component of the optical signal is changed.

3. The modulator unit as claimed in claim 2,
wherein the modulator unit is configured to vary the electrical voltage applied to the crystal over time.

4. The modulator unit as claimed in claim 1,
wherein an absolute value of the first phase of the first polarization component of the input signal in the first polarization direction differs from an absolute value of the second phase of the second polarization component of the retroreflected optical signal in the first polarization direction.

5. The modulator unit as claimed in claim 4,
wherein the polarization-dependent phase modulator is configured to change a difference between the first phase and the second phase over time.

6. The modulator unit as claimed in claim 1,
wherein the light source is configured to output light with a defined optical mode.

7. The modulator unit as claimed in claim 1,
wherein the modulator unit is configured to activate the light source so that the light source emits pulsed optical signals.

8. An optical signal transmission link, comprising:
a modulator unit as claimed in claim 1; and
a receiver configured to receive optical signals;
wherein the modulator unit is arranged to emit the output signal in a direction of the receiver.

9. A satellite comprising a modulator unit as claimed in claim 1.

* * * * *